United States Patent [19]
Inada

[11] 3,813,130
[45] May 28, 1974

[54] ANTISKID CONTROL SYSTEM
[75] Inventor: Masami Inada, Toyoake, Japan
[73] Assignee: Aisin Seiki Kabushiki Kaisha, Kariya-shi, Aichi-ken, Japan
[22] Filed: Nov. 20, 1972
[21] Appl. No.: 307,761

[30] Foreign Application Priority Data
Dec. 27, 1971 Japan.................................. 47/3535
Nov. 18, 1971 Japan.............................. 46/92542

[52] U.S. Cl. .......................... 303/21 F, 303/21 AF
[51] Int. Cl............................................... B60t 8/06
[58] Field of Search............ 303/21 F, 21 AF, 21 A, 303/21 B, 61–63, 68–69, 10; 188/181

[56] References Cited
UNITED STATES PATENTS
3,671,085 6/1972 Pasek et al....................... 303/21 F
3,682,513 8/1972 Oberthur............................ 303/21 F Primary Examiner—Duane A. Reger
Assistant Examiner—D. C. Butler
Attorney, Agent, or Firm—Flynn & Frishauf

[57] ABSTRACT

An antiskid control system includes a solenoid valve, computer and hydraulic pressure control means having a variable volume chamber defined by a piston and introduced with braking pressure fluid. Upon the suitable locking condition, the computer generates a signal to operate the solenoid valve, so that the piston is moved to cause the volume of the chamber to be large thereby releasing the locking condition.

6 Claims, 4 Drawing Figures

ANTISKID CONTROL SYSTEM

This invention relates to an antiskid control system, and more particularly to a hydraulically actuated control system.

It is an object of this invention to provide a hydraulically actuated antiskid control system which is high in reliability and is enabled to be miniaturized.

It is another object of this invention to provide an antiskid control system which does not effect a braking operation when the control system malfunctions due to the insufficient hydraulic pressure for some kind of trouble.

It is still another object of this invention to provide an antiskid control system which is able to control the flow of fluid in the control system so that a required acceleration speed of a wheel may be maintained.

SUMMARY OF THE INVENTION

According to one aspect of this invention there is provided an antiskid control system comprising a braking hydraulic pressure source, a power source, wheel cylinder means, first passage means which connects said pressure source to said wheel cylinder means, computer means for detecting the substantial locking condition of wheels to produce a first indicating signal, a first solenoid valve actuated in accordance with the first indicating signal from said computer, and hydraulic pressure control means provided in said first passage means including a housing, first servo means in communication with said power source, the communication between said first servo means and said power source means being interrupted by the solenoid valve when the wheels are in a substantially locking condition, first valve means mounted in said first passage means and interrupting said first passage means when the wheels are in substantially locking condition, a first piston which is operatively connected to said first servo means and which is slidably provided in said housing so as to usually hold said first valve means in its open position, a variable volume chamber formed within said housing by said first piston and adapted to vary effective volume between said first valve means and said wheel cylinder responsive to the operation of said first piston, by-pass passage means which communicates said hydraulic pressure means with said wheel cylinder means, second valve means provided in said by-pass passage means, second servo means in communication with said power source, and second piston means with a part thereof exposed in said first passage means and usually making said second valve means in a closed position by said second servo means.

The present invention can be more fully understood from the following detailed description when taken in connection with the accompanying drawings, in which:

FIGS. 1 and 2 show one embodiment of an antiskid control system according to this invention, wherein FIGS. 3 and 4 show another embodiment of an antiskid control system, wherein

Figure 1:
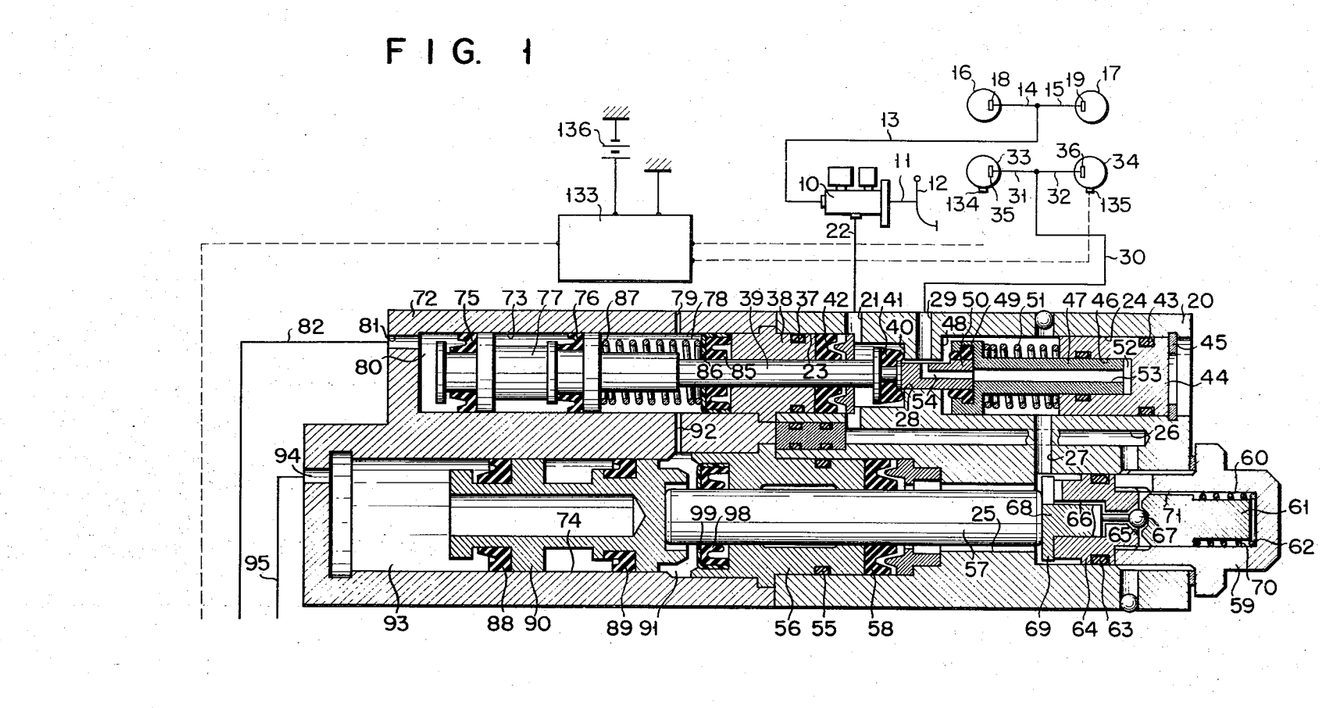
FIG. 1 is a sectional view of hydraulic control means and FIG. 2 is a sectional view of a solenoid valve.
Figure 2:
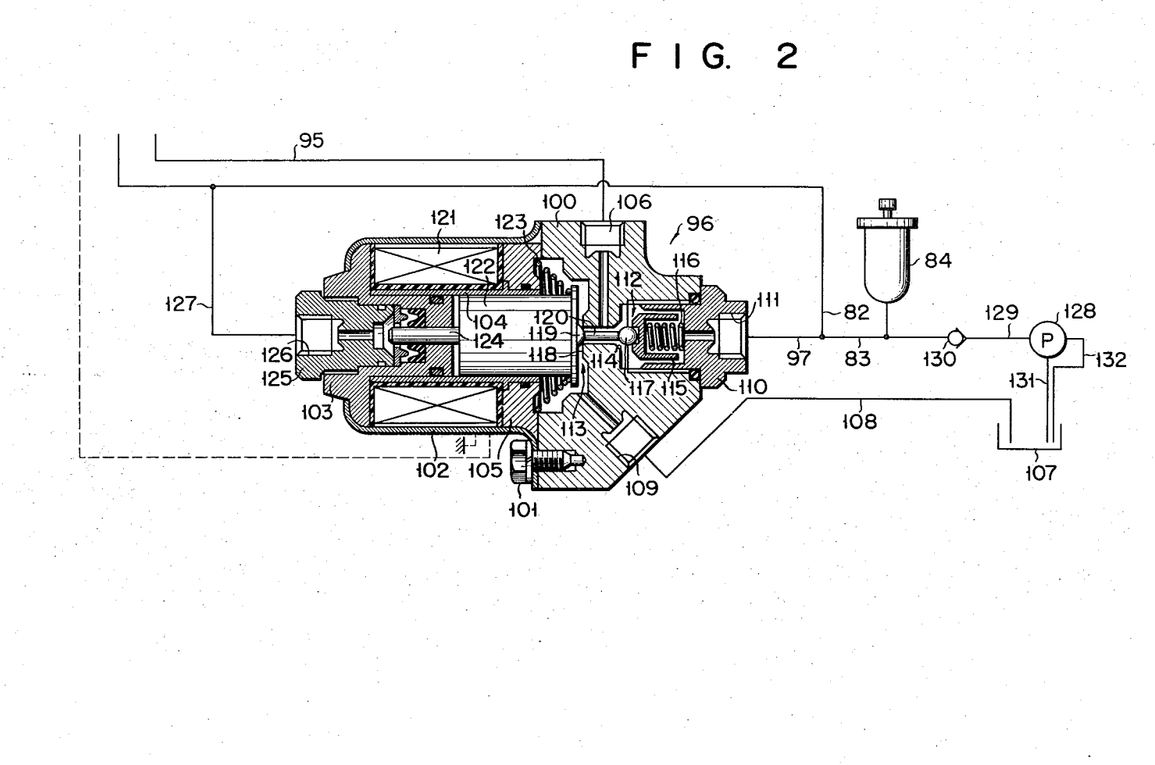

In a system according to the first embodiment as shown in FIGS. 1 and 2, numeral 10 is a tandem type brake master cylinder, within which both pistons, though not shown in the drawing, are provided and operatively connected through a push rod 11 to a brake pedal 12. When the brake pedal 12 is stepped on, the hydraulic pressure responsive to the stepping force of brake pedal is produced in both pressure chambers, not shown, inside the brake master cylinder. One pressure chamber in said brake master cylinder 10 is connected to wheel cylinders 18 and 19 of front wheels 16 and 17 through fluid lines 13, 14 and 15, while the other pressure chamber is connected through a fluid line 22 to a port 21 formed in a first housing 20 of a hydraulic brake means suitably fixed to the vehicle. Said first housing 20 comprises a step cylinder 23 open at the left end as viewed in FIG. 1 in communication with the port 21, a cylinder 24 coaxial to said cylinder 23 and open at the right end, a step cylinder 25 in parallel with both cylinders and open at both ends, a passage 26 to communicate said cylinder 23 with said cylinder 25, a passage 27 to communicate said cylinder 24 with said cylinder 25, a passage 28 to communicate said cylinder 23 with said cylinder 24, and a port 29 in communication with said passage 28. The port 29 is connected to wheel cylinders 35 and 36 of rear wheels 33 and 34 through fluid lines 30, 31 and 32. The left opening of said cylinder 23 is closed by a plug body 38 fitted into the cylinder with a seal member 37 mounted on its outer periphery and by a rod 39 slidably carried by means of said plug body. On the right end inserted into said cylinder 23 of said rod 39 a third valve body 41, which is detachable from and on a valve seat surface 40 by the slide movement of said rod, is secured. On the right side of the plug body 38 a seal member 42 is mounted to seal between the plug body and the rod. The pressing of said valve body 41 against said valve seat surface 40 causes to interrupt the communication between said cylinder 23 and said passage 28, while the separating of said valve body 41 from the valve seat surface causes to communicate the cylinder 23 with the passage 28. The right end opening of said cylinder 24 is closed by a plug body 44, on the outer periphery of which is mounted a seal member 43 and which is fitted into said cylinder, the plug body 44 being prevented by a stop ring 45 fixed to the first housing 20 from being slipped out. A cylinder 46, left end of which is opened, is formed in said plug body 44, and the right end of a rod 47 is slidably fitted into said cylinder. A second valve body 49, which is in contact with and detachable from a valve seat surface 48 by the slide movement in both directions of said rod, is secured to the left end of said rod 47. The pressing of valve body 49 against said valve seat surface 48 causes to interrupt the communication between said cylinder 24 and said passage 28, while the separating of said valve body 49 from the valve seat surface 48 causes to communicate the cylinder 24 with the passage 28. The left end of a rod 50, right end of which is secured to said valve body 49, is in engagement with said rod 39 passing through said passage 28, and when said valve body 41 is in contact with the valve seat surface 40, said valve body 49 is separated from the valve seat surface. A compression spring 51 is provided between the flange of said rod 47 and said plug body 44 to urge the rod 47 leftwards. When the force pressing said valve body 41 toward the valve seat 40 becomes smaller than the force of said spring 51, the valve body 41 is automatically separated from the valve seat surface 40 and the valve body 49 is made in contact with the valve seat 48. In order to prevent the sliding of rod 47 from being impeded, a chamber 52 in the cylinder 46 with the right end of the rod 47 exposed is communicated with said passage 28 by a passage 53 provided in the rod 47 and a passage 54 provided in the rod 50.

The left end opening of said cylinder 25 is closed by a plug body 56 whose periphery carries a seal member 55 and the right end is fitted into said cylinder, and a pistion 57 slidably carried. A seal member 58 is provided on the right side of the plug body 56 to seal between said plug body 56 and said piston 57. The right end opening of the cylinder 25 is closed by a plug body 59 threaded into the first housing 20. Said plug body 59 is formed with a cylinder 60 open at the left end, into which a piston 61 is slidably inserted. Said piston 61 is forced leftwards by means of a compression spring 62 provided between said piston and the plug body 59. A partitioning member 64 with a seal member 63 mounted on its outer periphery is fitted into the cylinder 25 and engaged with the left end of the plug body 59 so as to prevent it from being moved rightwards. The partitioning member is formed at its right end with a valve seat surface 65 and with a passage 66 leading from said valve seat surface to the left end surface. A first valve body 67 relative to said valve seat surface 65 is mounted in the passage 66 and held by and between a transmission member 68 with the left end surface engaged with said right end surface of said piston 57 and the pistion 61. When the force pressing the piston 57 rightwards is greater than the force of the spring pressing the piston leftwards, the valve body 67 is separated from the valve seat surface 65 so that said passages 26 and 27 may communicate through the cylinder 25 and the passage 66. To the contrary, when the force pressing the piston 57 rightwards is smaller than the force pressing the piston 61 leftwards, the ball valve 67 is made in contact with the conical seal 65 to interrupt the communication between said passages 26 and 27. A stopper 69 is provided on said transmission member 68 so that when the valve body 67 is sufficiently separated from the valve seat 65 to contact with said partitioning member 64, to thus prevent said transmission member 68 from being further moved rightwards. A chamber 70 in the plug body 59 with the right end of said piston 61 exposed is communicated with said passage 26 by a passage 71 provided in the periphery of said piston so as to prevent the sliding of the piston 61 from being impeded due to the hydraulic pressure. In a second housing 72, the right end surface of which is joined with the left end surface of the first housing 20, are provided a cylinder 73 open at the right end coaxial and having the same diameter as that of said cylinder 23 and a cylinder 74 open at the right end coaxial to said cylinder 25. The right end opening of the cylinder 73 is closed by the left end of said plug body 38 to be fitted therein, and the right end opening of the cylinder 74 is closed by the left end of said plug body 56 to be fitted therein. Both plug bodies 38 and 56 are fixed by holding the central outer peripheral flange thereof between the first housing 20 and the second housing 72. A second servo piston 77 with seal members 75 and 76 is slidably mounted within said cylinder 73. A chamber 78 in the second housing 72 with its right end surface of the piston 77 exposed is communicated with the atmosphere by a port 79 made in the side wall of the second housing, and a chamber 80 in the second housing with the left end surface of the piston 77 exposed is hydraulically directly coupled to an accumulator 84 by a port 81 made in the wall of the second housing and fluid lines 82 and 83 connected thereto (FIG. 2). Said piston 77 is pressed leftwards by a compression spring 87 provided between a retainer member 86 of the seal member 85 mounted on the left side of the plug body 38 and the flange of said piston. If said accumulator has a hydraulic pressure required to actuate the system, said valve body 41 is made in contact with said seat 40 and said valve body 49 is separated from said seat 48, while if said accumulator has no hydraulic pressure required to actuate the system, said valve body 41 is separated from said seat 40 by action of said springs 51 and 87 and said valve body 49 is made in contact with said valve seat 48. A first servo piston 90 with seal meambers 88 and 89 mounted thereon is slidably fitted into said cylinder 74. A chamber 91 in the second housing with the right end surface of said piston exposed is communicated with said chamber 78 through a passage 92 made in the partitioning wall of the second housing 72. A chamber 93 in the second housing with the left end surface of the piston 90 exposed is connected to said accumulator 84 through a port 94, a fluid line 95 successively connected with the former, a solenoid valve 96, and fluid lines 97 and 83 (FIG. 2). When the accumulator has a hydraulic pressure as required and said chamber 93 is made in communication with said accumulator through the solenoid valve 96, the piston 57 is adapted to be held, by the piston 90, in such a position that the ball valve 67 is separated from the valve seat 65, as shown in the drawing. On the left side of said plug body 56 are provided a seal member 98 to seal between the shaft 57 and the plug body 56, and a retainer member 99 of the seat member.

As shown in FIG. 2, the solenoid valve 96 has a second housing 102 fixed by a bolt 101 to a first housing 100, the second housing fixing, a third housing 103, a fourth housing 104 and a fifth housing 105 to the first housing. Said first housing 100 is formed with a port 106 to which said fluid line 95 is connected, and a port 109 to which a fluid line 108 in communication with a reservoir 107 is connected. A plug body 110 is threaded into the first housing 100 and formed with a port 111 to which said fluid line 97 is connected. Within the first housing 100, there are disposed a valve 112, which serves to make a selected communication between both ports 106 and 111, and a valve 113 which serves to make a selected communication between both ports 106 and 109. Said valve 112 comprises a valve seat surface 114 formed in the first housing 100 and a ball valve 117 forced towards the valve seat surface 114, which is held by a retainer 115 and a compression spring 116 provided between said retainer and said plug body 110. Said valve 113 comprises a valve seat surface 118 formed in the first hosuing 100 and a semi-spherical shaped valve body 119. This valve body 119 has a rod 120 which separates the valve body 117 from the valve seat surface 114 when said valve body 119 is seated on the valve seat surface 118. Between the second housing 102 and the fourth housing 104 there is provided a solenoid coil 121, and a reciprocating plunger 122 is disposed in the fourth housing 104 to be urged rightwards by a compression spring 123. When no current flows in the solenoid coil 121, the plunger 122 is made in contact with the valve body 119 to close the valve 113. The third housing 103 slidably supports a rod 124, of which the right end contacts with the plunger 122, and the left end is exposed to a port 126 made in a plug body 125. Said port 126 is connected to a fluid line 127 branched from the fluid line 82.

The diameter of the rod 124 is selectively determined to be the same as that of opening in which the valve 113 is sealed.

A pump 128 driven by the engine is communicated with the aforesaid accumulator 84 through a check valve 130 by a fluid line 129 and is communicated with the aforesaid reservoir 107 through fluid lines 131 and 132, whereby the accumulator stores therein hydraulic pressure as required. In FIG. 1, numeral 133 denotes a computer which is electrically connected to sensors 134 and 135 which detect the rotation of rear wheels 33 and 34 and which is also electrically connected to the solenoid coil 121 of the solenoid valve 96, and which is further of a known type, wherein electric current is flown into the solenoid coil 121 when the rear wheels 33 and 34 are likely to be locked. Numeral 136 denotes a power source.

The operation of the present system constructed as described above is as follows. First, when the hydraulic pressure is stored in the accumulator 84 by means of the pump 128 and the brake pedal 12 is released, the front wheels 16 and 17 as well as rear wheels 33 and 34 are in normal rotation so that the computer 133 will not cause a current to flow into the solenoid coil 121 in the solenoid valve 96, the plunger 122 is slid and displaced rightwards by action of the spring 123 to close the valve 113 and to open the valve 112, and the hydraulic pressure in the accumulator 84 is supplied through the fluid lines 83 and 97, solenoid valve 96, and fluid line 95 from the port 94 to the chamber 93 and the valve body 67 is separated from the valve seat surface 65. The hydraulic pressure in the accumulator is also supplied through the fluid lines 83, 82 and 127 to the port 126 of the solenoid valve 96 so that the force urging the plunger 122 leftwards by the valve body 119 may be offset. Further, the hydraulic pressure in the accumulator 84 is also supplied through fluid lines 82, and 83 from the port 81 to the chamber 80, and the valve body 41 is made in contact with the valve seat surface by the piston 77 and the valve body 49 is separated from the valve seat surface 48. In this condition, when the brake pedal 12 is stepped on, braking pressure responsive to said stepping force of the brake pedal is supplied through fluid lines 13, 14 and 15 from the master cylinder 10 to each wheel cylinder 18 and 19 of the front wheel 16 and 17 and at the same time is supplied through the fluid line 22, port 21, cylinder 23, passage 26, cylinder 60, passage 66, cylinder 25, passage 27, cylinder 24, passage 28, port 29, fluid lines 30, 31 and 32 to each wheel cylinder 35 and 36 of the rear wheels 33 and 34 to thus effect braking operation. Here, when the force of stepping the brake is so great that wheels may likely be locked, the computer 133 causes the current to flow into the solenoid coil 121 of the solenoid valve 96, whereby the plunger 122 is slid and displaced leftwards to close the valve 112 and at the same time to open the valve 113 and to communicate the chamber 93 with the reservoir 107, and accordingly, both pistons 57 and 90 are slid and displaced leftwards by a braking hydraulic pressure, and the valve body 67 is made in contact with the valve seat surface to interrupt the communication between the passage 60 and the passage 66, thus establishing a circuit from said valve body 67 to the wheel cylinder. Since the volume in a circuit from the value body 67 to the wheel cylinder is increased due to the sliding movement of the piston 57, the braking hydraulic pressure in the wheel cylinders 35 and 36 is lowered to soften the braking force, to thus restore rotation of rear wheels 33 and 34. When restored as such, the computer again causes a current not to flow into the solenoid coil 121, resulting in closing the valve 113 and opening the valve 112 so as to supply the accumulator pressure into the chamber 93, and then pistons 90 and 57 are slid and displaced rightwards to elevate the braking pressure of wheel cylinders 35 and 36. The repetition of this operation at a high speed prevents the rear wheels from being locked to thus avoid so-called "skid".

In case a hydraulic pressure as required is not stored in the accumulator 84 due to the failure of circuit or the like, the hydraulic pressure is not supplied to the chamber 93. Therefore, when the brake pedal 12 is once stepped on, the pistons 57 and 90 are slid leftwards by a braking pressure to remain the valve body 67 in contact with the valve seat surface 65. But, since the hydraulic pressure is not supplied into the chamber 80, the piston 77 is slid leftwards by springs 51 and 87 to separate the valve body 41 from the valve seat 40 and to contact the valve body 49 with the valve seat 48, and braking hydraulic pressure of the master cylinder 10 is supplied through the fluid line 22, port 21, cylinder 23, passage 28, port 29, fluid lines 30, 31 and 32 to the wheel cylinders 35 and 36, to thus effect a conventional braking.

As described in the foregoing, the system employs as a power source the hydraulic pressure, which is obtained in the form of pressure higher than vacuum of engine heretofore used, so that the system may be miniaturized. Further, even if the hydraulic pressure is not produced because of some failure, a usual braking operation can be effected without having any trouble, so that there are such advantages that the safety is high and the design is considerably freely made because a conventional braking operation is to be carried out by means of a by-pass circuit.

Figure 3:
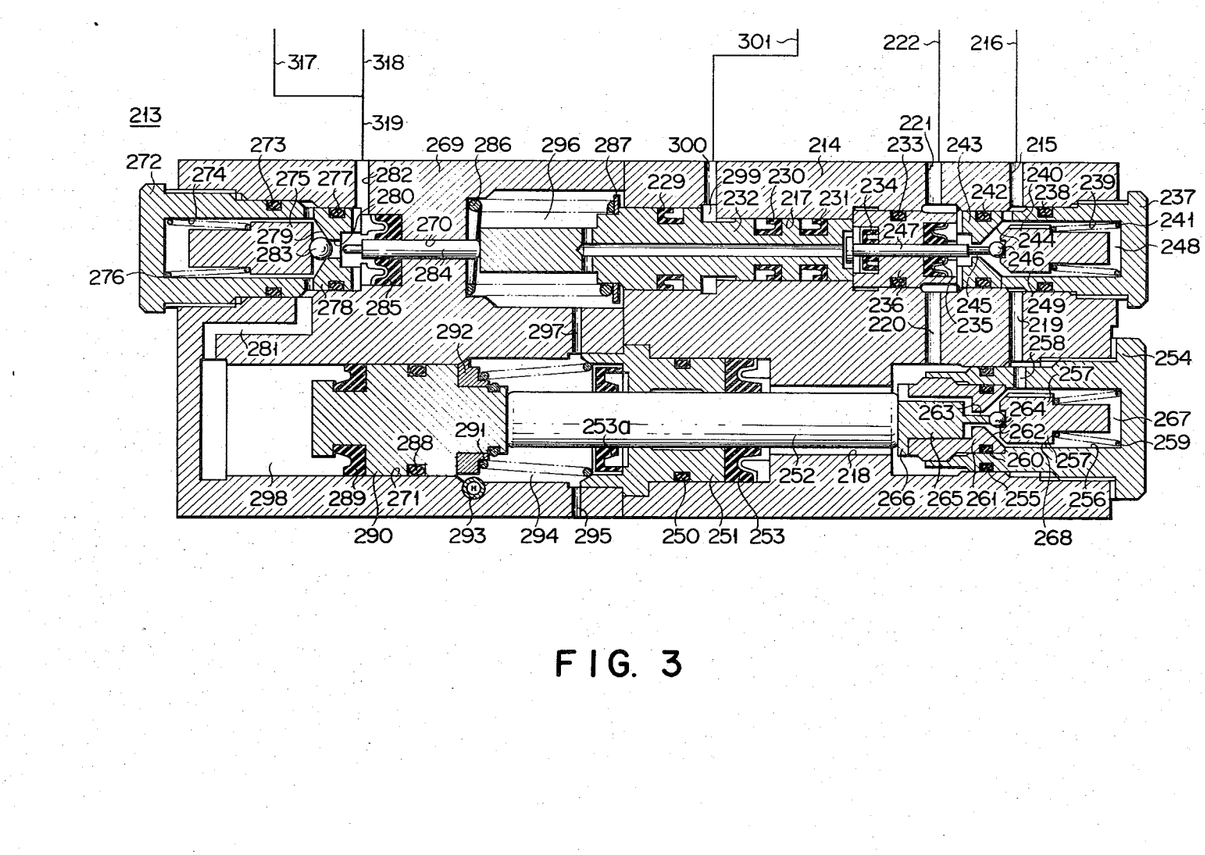
FIG. 3 is a sectional view of hydraulic control means and FIG. 4 is a sectional view of a solenoid valve.
Figure 4:
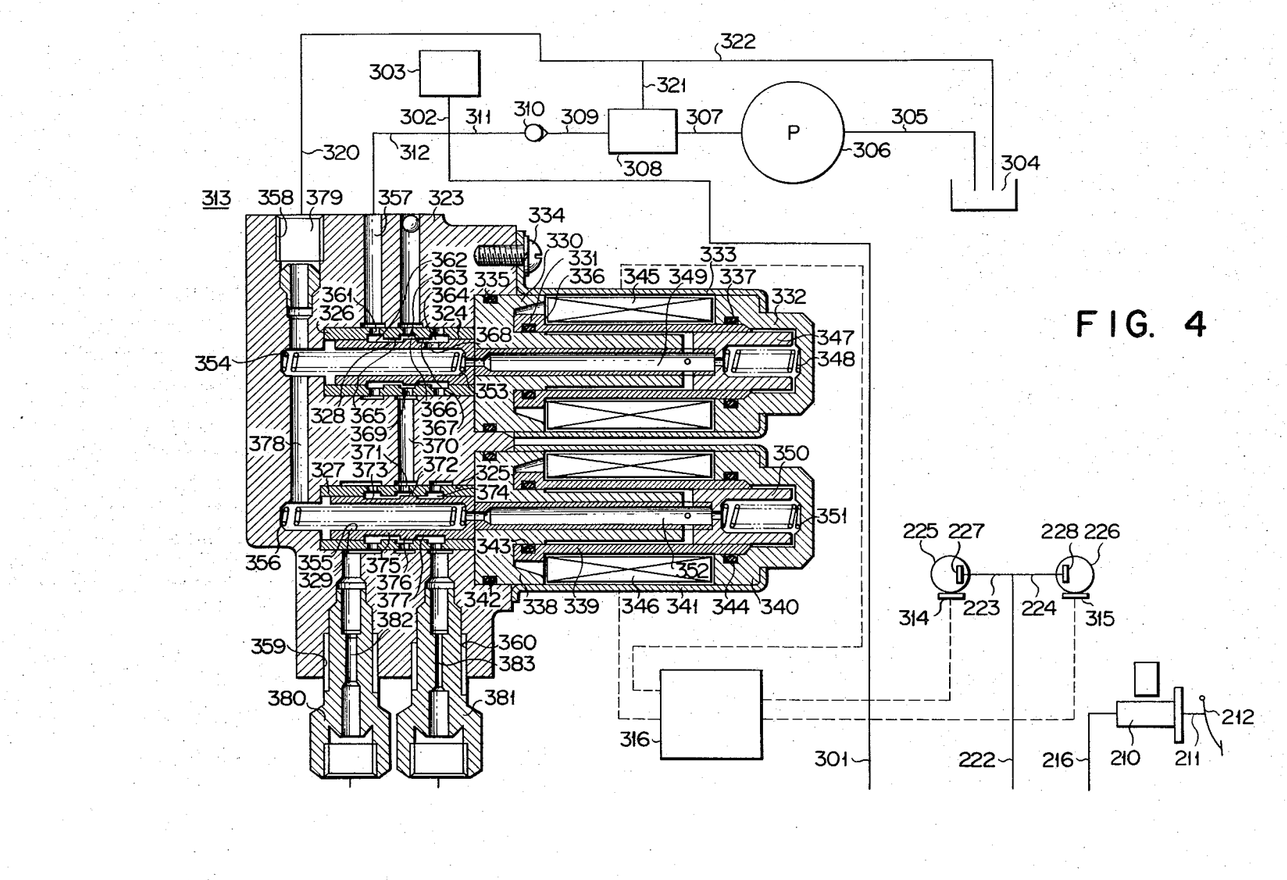

In an antiskid control system as another embodiment shown in FIGS. 3 and 4, numeral 210 is a brake master cylinder, piston of which is provided therein, though not shown, and which is operatively connected through a push rod 211 to a brake pedal 212 so that when said brake pedal is stepped on, hydraulic pressure responsive to the force of stepping on the brake pedal is produced in a pressure chamber (not shown) in said brake master cylinder 210. Said pressure chamber in the brake master cylinder 210 is connected through a fluid line 216 to a port 215 in a first housing 214 of a hydraulic pressure control means 213 properly fixed on the vehicle. A stepped cylinder 217 open at both ends is formed in said first housing 214 and in communication with said port 215. A stepped cylinder 218 open at both ends is arranged in parallel with said cylinder 217 to communicate it through passages 219 and 220. A port 221 in communication with said cylinder 217 is formed in said first housing 214, said port 221 being connected through fluid lines 222, 223 and 224 to wheel cylinders 227 and 228 of wheels 225 and 226. The second piston 232 with seal members 229, 230 and 231 mounted on the outer periphery is slidably disposed in the left end opening of said cylinder 217, and a plug body 236 with a seal member 233 on the outer periphery and seal members 234 and 235 on the inner periphery mounted is fitted into said cylinder 217 at the right end of said piston 232. The right end opening of said cylinder 217 is closed by a plug body 237 threaded into said first housing 214. Said plug body 237 has a seal member 238 mounted on its outer periphery and is provided at its inner periphery with a cylinder 239 open at left end, in which a piston 240 is slidably fitted. Said piston 240 is pressed leftwards by a compression spring 241 provided between the step portion of said piston 240 and said plug body 237. A partitioning member 243 with a seal member 242 mounted on its outer periphery is fitted into said cylinder 217 and engaged at its both end surfaces with said plug members 236 and 237 so as to avoid its axial movement, and said partitioning member 243 being formed at its right end surface with a conical shaped valve seat surface 244 and a passage 245 is formed to be led from said valve seat surface 244 to the left end surface. The third valve body 246 relative to said valve seat surface 244 is provided within said passage 245, left end surface of which is held by means of a plunger 247 engageable with the right end of said piston 232, while, right end surface of which is held by means of said piston 240. If the force of pressing said piston 232 rightwards is greater than the force of pressing said piston 240 leftwards, said valve body 246 is separated from said valve seat surface 244 to maintain the passage 245 in the open condition, while if the force of pressing said piston 232 rightwards is smaller than the force of pressing said piston 240 leftwards, said valve body 246 is made in contact with said valve seat surface 244 to maintain the passage 245 in the closed condition. A chamber 248 in the cylinder with the right end surface of said piston 240 exposed is communicated with said passage 219 by a passage 249 provided in said piston to prevent the sliding movement of said piston 240 from being impeded due to the hydraulic pressure of the brake. The left end opening of said cylinder 218 is closed by a plug body 251 with a seal member 250 mounted on its outer periphery and fitted into said cylinder 218, and the first piston 252 slidably supported by said plug body 251, and seal members 253 and 253a are provided on both ends of said plug body 251 to seal between said plug body 251 and said piston 252. The right end opening of the cylinder 218 is closed by a plug body 254 threaded into said first housing 214. Said plug body 254 has a seal member 255 mounted at its outer periphery and is further formed with a cylinder 256 open at the left end and a piston 257 is slidably fitted in said cylinder 256. Said plug body 254 is formed with a port 258 which communicates said passage 219 formed in said first housing 214 with said cylinder 256. Said piston 257 is pressed leftwards by a compression spring 259 provided between the step portion of said piston and said plug body 254. A partitioning member 261 with a seal member 260 mounted on its outer periphery and fitted in said cylinder 256 is engaged with the left end of said plug body 254 so as to avoid its rightward movement, said partitioning member 261 being formed at its right end surface with a conical shaped valve seat surface 262 and being formed with a passage 263 leading to the left end surface from said valve seat surface 262. A first valve body 264 relative to said valve seat surface 262 is mounted inside said passage 263 and held by a transmission member 265, left end surface of which is engaged with the right end surface of said piston 252, and said piston 257. In case the force of pressing the piston 252 rightwards is greater than the force of pressing the piston 257 leftwards, the ball valve 264 is separated from the valve seat 262 to open said passage 263, while in case the force of pressing the piston 252 rightwards is smaller than the force of pressing the piston 257 leftwards, the ball valve 264 is made in contact with the valve seat 262 to close said passage 263. A stopper 266 is provided on a transmission member 265 so that when the ball valve 264 is sufficiently separated from the valve seat 262 to contact with said partitioning member 261, to thus prevent said transmission member 265 from further being moved rightwards. A chamber 267 with right end surface of said piston 257 exposed is communicated with said port 258 through a passage 268 provided in said piston so that the sliding movement of the piston 257 may be prevented from being impeded due to the hydraulic pressure. A second housing 269, right end surface of which is joined and fixed on the left end surface of the first housing, is formed with a step cylinder 270 open at both ends coaxial to said cylinder 217 and a step cylinder 271 open at the right end coaxial to said cylinder 218, the right end opening of the cylinder 270 being closed by movably inserting said piston 232. The left end opening of the cylinder 270 is closed by a plug body 272 threaded into said second housing 269. The plug body 272 has at its outer periphery a seal member 273 mounted and is formed with a cylinder 274 open at the right end, within which a piston 275 is slidably fitted. Said piston 275 is pressed rightwards by a compression spring 276 provided between said plug body 272. A partitioning member 278 with a seal member 277 mounted on its outer periphery and fitted in said cylinder 270 is prevented from being moved rightwards by engaging with the right end of said plug body 272, and said partitioning member 278 is formed at its left end surface with a conical shaped valve seat surface 279 and a passage 280 leading to the right end surface from said valve seat surface 279. Further, said passage 280 is made in communication with a passage 281 which communicates between aid cylinders 270 and 271, and with a port 282 formed in the second housing. A second valve body 283 relative to said valve seat surface 279 is provided in said passage 280 and held by a plunger 284, which is in engagement with a small diameter portion of said piston, and said piston 275. In case the force of pressing the piston 232 leftwards is greater than the force of pressing the piston 275 rightwards, the valve body 283 is separated from the valve seat surface 279 to open said passage 280, and to the contrary, in case the force of pressing the piston 232 leftwards is smaller than the force of pressing the piston 275 rightwards, the valve body 283 is made in contact with the valve seat surface 279 to close said passage 280. Numeral 285 is a seal member, which seals between said cylinder 270 and plunger 284. Said piston 232 is pressed rightwards by a compression spring 286 provided between the step portion of said cylinder 270. A spring retainer 287 functions as a stopper to check the piston 232 moving rightwards in an axial direction.

The right end opening of said cylinder 271 is closed by inserting said plug body 251 therein. The axial movement of the plug body 251 is regulated by said first and second housings 214 and 269. A piston 290 with seal members 288 and 289 mounted therein is slidably disposed in the cylinder 271. One end of said piston 290 is in contact with said piston 252 and further said piston 290 is pressed leftwards by a compression spring 291 provided between said plug body 251 and piston. Numeral 292 is a magnet mounted on said piston 290 and is provided opposite to a lead switch 293 secured to said second housing 269. According to the axial movement of said piston 290, said lead switch 293 performs ON or OFF operation depending upon the position of piston 290, and the lead switch 293 is in an ON position in the drawing. According to this embodiment, when the valve body 264 is made in an open position by a transmission body 265, the lead switch is ON, while in a closed position it is OFF. If this operation is operatively employed into, for example, a flashing lamp mounted on a driver's seat not shown, movement of piston, that is, operation or non-operation of antiskid means, or abnormal condition such as leaky oil in the chamber 298 may be early found. A chamber 294 with the right end surface of said piston 290 exposed is communicated with the atmosphere by a port 295 formed in the second housing 269, and a chamber 296 with the left end surface of the piston 232 exposed is communicated with the atmosphere by a port 297 formed in the second housing 269, said chamber 294 and said port 295. Said chamber 298 with the left end surface of said piston 290 exposed is communicated with said passage 281. A chamber 299 formed by said piston 232 and the first housing 214 is hydraulically directly connected to an accumulator 303 by a port 300 and fluid lines 301 and 302 as shown in FIG. 4.

Numeral 304 is a reservoir tank, which is connected through a fluid line 305 to a hydraulic pump 306. Said hydraulic pump 306 is driven by an engine or motor not shown, and is connected through a fluid line 307 to an unloader valve 308 and is further transmitted to said accumulator 303 through a fluid line 309, a check valve 210, a fluid line 311, and said fluid line 302. The accumulator 303 is connected to a solenoid valve 313 through said fluid line 302 and fluid line 312. The solenoid valve 313 is electrically connected to a computer 316 which is electrically connected to sensors 314 and 315 which detect the rotation of said wheels 225 and 226, and is also connected to a fluid line 317 or a fluid line 318 and is in communication with said port 282 of said second housing 269 through a fluid line 319. The computer 316 which senses the rotation of wheel through sensors 314 and 315 is a known type, which produces a first indicating signal when a rotating speed of wheels is reduced by a braking operation and is greater than the reduction speed firstly required, that is, in case the wheels are in a substantially locking condition, and produces a second signal responsive to the magnitude of the acceleration or deceleration speed of the wheels relative to the second value as required, when or after said first indicating signal has been produced. The solenoid valve 313 is connected to through said fluid lines 320 and 322. Said unloader valve 308 acts, when the hydraulic pressure in the hydraulic servo circuit is in excess of a value established, to return the flow of pump through fluid lines 321 and 322 to the reservoir tank. A first housing 323 for said solenoid valve 313 is formed with cylinders 324 and 325 open at the right end, and the second housing 326 and the third housing 327 are fitted in said cylinders 324 and 325, respectively. Further, pistons 328 and 329 are slidably disposed in said housings 326 and 327, respectively.

Said first housing 323 is provided so as to close the right end of said cylinder 324 by means of a cover plate 333, on which a fourth housing 330, fifth housing 331 and sixth housing 332 are fixed. Numerals 335, 336 and 337 are all seal members. Similarly, a seventh housing 338, an eighth housing 339, and a ninth housing 340 are fixed to the first housing by means of a cover plate 341 through known screw means, not shown, to close the right end of said cylinder 325. Numerals 342, 343 and 344 are all seal members.

On the outer peripheries of said fifth housing 331 and eighth housing 339 are disposed solenoid coils 345 and 346, respectively. A moving core 347 is movably disposed in an axial direction inside the fifth housing and is slightly urged leftwards by action of a compression spring 348 provided between said sixth housing 348 and it to contact with a plunger 349 movably disposed in the fourth housing 330. Said spring 348 acts to stop rattling of said core 347. When said coil 345 is not electrically conductive, said moving core 347 is positioned as shown, not to contact with said fourth housing 330.

A moving core 350 is disposed movably in an axial direction inside the eighth housing 339 and is slightly urged leftwards by a compression spring 351 provided between said ninth housing 340 and it to contact with a plunger 352 movably disposed inside the seventh housing 338. When said coil 346 is not in conductive, said moving core 350 is positioned as shown not to contact with said seventh housing 338. Said spring 351 acts to stop rattling of said core 350. Said piston 328 forms a cylinder 353 open at the left end and is urged rightwards by a compression spring 354 provided between said housing 323 and it to contact with said plunger 349, said movement being regulated by said fourth housing.

Said piston 329 forms a cylinder 355 open at the left end and is urged rightwards by a compression spring 356 provided between said housing 323 and it to make in contact with said plunger 352, said movement being regulated by said seventh housing. Ports 357, 358, 359 and 360 are formed in said first housing 323, said port 357 being communicated with said fluid line 312. Said ports 358, 359 and 360 are in communication with said fluid lines 320, 317 and 318. Said second housing 326 is formed with a port 361 in communication with said port 357 and chambers 362 and 363. Said piston 328 is formed with a port 368, which communicates a channel 365, a land 366, channels 367 and 369 with said cylinder 353. Further, said second housing 326 is formed with a port 369 in communication with said chamber 363, said port 369 being communicated with a passage 370 which communicates between said cylinders 324 and 325 in said first housing 323. Similarly, the third housing 327 is formed with a port 371 in communication with said passage 370, and further chambers 372, 373 and 374 in communication with said port 371. Said chambers 373 and 374 are commmunciated with said ports 359 and 360, respectively. Said piston 329 is formed with a channel 375, a land 376, and a channel 377. The passage 378 communicates between said cylinders 324 and 325 and is communicated with said port 358. A plug body 379 is fitted in said port 358 to communicate said fluid line 320 with a port 358. Plug bodies 380 and 381 are fitted in said ports 359 and 360. Said plug bodies 380 and 381 have passages 382 and 383, respectively, and the effective diameter of said passage 382 is greater than that of said passage 383. Said passage 382 communicates between said fluid line 317 and said port 359, and said passage 383 communicates between said fluid line 318 and said port 360. In case said coil 345 actuated by the first indicating signal from the computer is non-conductive, said moving core 347 is positioned as shown not to press the plunger 352 leftwards, the piston 328 is positioned as shown. Therefore, the port 357 is communicated with the port 361, the chamber 362, the groove 365, the chamber 369, and the passage 370. In case the coil 345 is in conductive, the moving core 347 is attracted leftwards due to the magnetic force to contact with the fourth housing 330. Due to the foregoing operation of the core 347, the plunger 349 moves the piston 328 leftwards against the urging force of the spring 354. The leftward movement of the piston 328 causes chambers 362 and 363 to be interrupted by a land 366 and then port 357 and passage 370 to be blocked. The leftward movement of the piston 328 causes the chamber 363 to communicate through the channel 367 with the chamber 364, so that the passage 370 is made in communication with the port 369, the chamber 363, the channel 367, the chamber 364, the port 368, the port 358, and the fluid line 320.

When the coil 346 actuated by the second indicating signal from the computer 316 is in non-conductive, the moving core 350 is positioned as shown not to press the plunger 352 so that the piston 329 is positioned as shown. Therefore, the chamber 373 is communicated through the channel 375 with the chamber 372, so that the passage 370 is made in communication with the fluid line 317 through the port 371, the chamber 372, the channel 375, the chamber 373, the port 359 and the passage 382. In this case, the fluid passes through the relatively large diameter passage 382 at a higher speed. On the other hand, in case the coil 346 is conductive, the moving core 350 is moved leftwards due to the magnetic force to contact with the seventh housing 338. The foregoing operation of the core 350 causes the plunger 352 to move the piston 329 leftwards against the urging force of the spring 356. Therefore, the communication between chambers 372 and 373 is interrupted by the land 276, and the chamber 372 is communicated through the channel with the chamber 374. Accordingly, the passage 370 is communicated with the fluid line 318 through the port 371, chamber 372, channel 377, chamber 374, port 360, and passage 383. In this case, the fluid passes through the relatively small diameter passage 383 at a lower speed.

Whether said passage 370 is communicated with fluid line 318 or fluid line 317 is determined by the condition of the coil 346, excited or not. Said coil is to be excited when the second indicating signal is entered from the computer 316 and otherwise to be de-energized. Consequently, wheels 225 and 226 are made in a locked condition and the first indicating signal is produced from the computer and thereafter, in case the accelerating or decelerating speed of the wheel reaches a value as required according to the condition of road, the second indicating signal is produced from the computer, so that the passage 370, which has been communicated with the fluid line 317, is made in communication with the fluid line 318, and the flow speed of the liquid to or from the chamber 198 becomes slow, to thus reduce the accelerating speed of said wheel. In case that the accelerating speed of wheel is less than the second value as required, the speed of fluid flow with respect to the chamber becomes fast by the operation reverse to the above, to thus increase the accelerating speed of wheel, which can easily be understood.

The operation of the system of this invention having the foregoing construction will now be described. In case the hydraulic pressure as required is stored in the accumulator by the pump 306, said pressure reaches the chamber 299 via fluid lines 302, and 301 and port 300, and causes the piston 232 to be slid and displaced leftwards against the urging force of the spring 286 and pressing the plunger 284 leftwards so that the plunger 284 may contact with the valve body 283, and the valve body 283 is separated from the valve seat surface 279 against the urging force of the spring 276 to open the passage 280. Due to the foregoing operation of said piston 232, the plunger 247 is to be separated from the valve body 246 and the valve body 246 is made in contact with the valve seat surface 244 to close the passage 245. In case the brake pedal 212 is released, wheels 225 and 226 are in normal rotation so that the computer 316 will not allow a current flow into the coil 345 of the solenoid valve 313. In the computer, the speed in variation of hydraulic pressure in the hydraulic servo circuit may be controlled by making the coil 346 conductive or non-conductive. In case the coil 346 is non-conductive, the passage 370 and the fluid line 317 are communicated through the passage 382 so that the flow speed in hydraulic servo circuit is fast, and therefore hydraulic variation is made fast, while in case the coil 346 is conductive, the passage 370 is communicated through the passage 383 with the fluid line 318, and the hydraulic circuit passes through the passage 383 so that the flow speed is slow, delaying the adjustment of hydraulic variation. Thus, the computer 316 also controls the flow speed of hydraulic servo circuit. In an ordinary usual condition, that is, in case the computer does not produce the first signal which energizes the coil 345 and the coil 146 is non-conductive, the hydraulic pressure in the accumulator is supplied to the chamber 298 through the fluid lines 302 and 312, ports 357 and 361, chamber 362, channel 365, chamber 363, port 369, passage 370, port 371, chamber 372, channel 375, chamber 373, port 359, passage 382, fluid lines 317 and 319, port 282, passage 280, and passage 281.

Therefore, said hydraulic pressure causes the piston 290 to be slid and displaced rightwards against the urging force of the spring 291 and the piston 252 and transmission member 265 to be moved rightwards. At this time, the lead switch is turned in ON position and the transmission member 265 is made in contact with the valve body 264, and the transmission member 265 causes the valve body 264 to be separated from the valve seat surface 262 against the urging force of the spring 259 to open the passage 263. Accordingly, when the brake pedal 212 is stepped on, the braking hydraulic pressure responsive to said force of stepping the brake pedal is supplied to wheel cylinders 227 and 228 of wheels 225 and 226 from the master cylinder 210 through the fluid line 216, port 215, passage 219, port 258, passage 263, passage 220, port 221, fluid pipes 222, 223 and 224, to effect a braking operation. When the wheels are likely to be locked because the stepping force of brake is too great, the computer causes an electric current to be flown into the coil 345 of solenoid change-over valve 313 so that the moving core 347 moves leftwards, the plunger 349 moves leftwards, the piston 328 being moved leftwards against the urging force of the spring 354, and the communication between chambers 372 and 363 is blocked by the land 366 so that the hydraulic pressure in the accumulator 393 is not supplied into the hydraulic chamber 298, and the chambers 363 and 364 are communicated by the channel 367. Since the passage 370 is communicated with the reservoir tank 304 through the port 369, chambers 363 and 364, port 368, cylinder 353, port 358, and fluid lines 320 and 322, the hydraulic pressure in the chamber 298 is reduced. Therefore, the piston 290 is moved leftwards by the urging force of the spring 291, and at this time the lead switch 293 is turned in OFF position, and the piston 252 and transmission member 265 are moved leftwards due to the braking pressure to increase volume in a circuit from the passage 263 to the wheel cylinder, to thus lower the braking pressure of the wheel cylinders 227 and 228. With this, if rotation of wheels 225 and 226 is restored, the computer 216 causes a current not to be flown into the coil 245, and the hydraulic pressure in the accumulator is supplied into the chamber 298 to slidably move and displace the piston 290 against the urging force of the spring 291 and moving the piston 252 and the transmission member 265 rightwards, at this time the lead switch is turned in ON position, to thus reduce the volume in a circuit from the passage 263 to wheel cylinders and to elevate the braking hydraulic pressure of the wheel cylinders 227 and 228. The repetition of this operation at a high speed prevents locking of wheels 225 and 226, to thus prevent so-called skid.

The system described above assures the following conventional braking operation in case, for example, that the computer 316 is not operated and antiskid is then not actuated. In case the required hydraulic pressure is stored in the accumulator 303, the hydraulic pressure in the accumulator 303 is supplied to the chamber 299, so that the piston 232 is moved leftwards to open the passage 280 and the hydraulic pressure in the accumulator 303 is supplied to the chamber 298 to move the piston 290 rightwards to open the passage 263, and the master cylinder 210 and the wheel cylinder are communicated, the braking hydraulic pressure is supplied from the master cylinder 210 to the wheel cylinders 227 and 228, to thus effect the braking operation. In case the required hydraulic pressure is absent, the hydraulic pressure is not supplied to the chamber 299, so that the piston 232 is moved rightwards by the urging force of the spring 286, the plunger 284 is also separated from the valve body 283, which is made in contact with the valve seat surface 279 by the urging force of the spring 276 of the piston 275 to automatically close the passage 280. Therefore, since the piston 290 is remained in its displaced position against the urging force of the spring 291 by the hydraulic pressure of passages 281 and 282, the valve body 264 is separated from the valve seat surface 262 by the transmission member 265 to maintain the passage 263 in its open condition and communicating between the master cylinder 210 and the wheel cylinder, thereby the braking pressure is supplied from the master cylinder 210 to wheel cylinders 227 and 228, to thus effect the braking operation.

In this case, the hydraulic pressure is maintained in the chamber 298 so that the passage 263 is in open condition, and the leftward movement of piston 265 is checked by the piston 252 to maintain the constant volume in the braking hydraulic circuit, whereby the braking effect of brake pedal 212 relative to the pedal stroke may be normally maintained so as to prevent the braking effect relative to the brake pedal stroke from being reduced. Further, according to the present invention, in case the hydraulic pressure is not stored in the accumulator 303, the hydraulic pressure in the chamber 298 is diminished or gone for some reason, the piston 290 is slid and displaced leftwards by the urging force of the spring 291, at this time the lead switch 293 is turned in ON position, the contact between the transmission member 265 and the valve body 264 is released, the valve body 264 is made in contact with the valve seat surface by the urging force of the spring 259 of the piston 257, and even if passage 263 is made to be closed, the hydraulic pressure is not supplied to the chamber 299 in the piston 232 so that the piston 232 is slid and displaced rightwards by the urging force of the spring 286 of the piston 232, the plunger 247 is made in contact with the valve body 246, the valve body 246 is separated from the valve seat surface 244 by the urging force of the spring 241 of the piston 240 to open the passage 245, to be able to maintain the communication between the master cylinder 210 and the wheel cylinder through the passage 245 and to thus effect the conventional braking.

Since the system constructed as above employs a hydraulic pressure, as a power source, produced by a hydraulic pump driven by an engine or a motor as described above, the system can be made into a small type and is high in its responsive speed, and may readily be incorporated into a system of a static pressure type braking system of a master cylinder driven type without any modification. In case of trouble with the antiskid operation, the ordinary braking operation is assured as follows. In case the required hydraulic pressure is stored in the accumulator 303, the leftward movement and displacement of the second piston 232 causes the passage 280 to be opened, the hydraulic pressure in the accumulator 303 is supplied to the chamber 298 to slidably move and displace the piston 290 rightwards to then open the passage 263, to thus communicate between the master cylinder 210 and the wheel cylinder so as to effect the ordinary braking operation.

In case the required hydraulic pressure is not stored in the accumulator 303, the rightward movement or displacement of the second piston causes the passage 245 to be opened and the passage 280 to be closed, the piston 290 is held to maintain its rightward movement and displacement by the hydraulic pressure of passage 281 and the chamber 298 so that the passage 263 may be opened, to thus communicate between the master cylinder 210 and the wheel cylinder so as to effect the ordinary braking operation.

Further, in case the required hydraulic pressure is not stored in the accumulator 303 and the hydraulic pressure in the chamber 298 is dropped or gone for some reason, the piston 290 is slid and displaced leftwards to close the passage 263, but the second piston 232 slides and displaces rightwards to open the passage 245, to thus communicate between the master cylinder 210 and the wheel cylinder so as to effect the ordinary braking operation.

As in the foregoing, it has an advantage to provide an extremely high safety without affecting the ordinary braking operation. For the sake of safety, the movement of the piston 290, which affects on the antiskid operation and the normal braking opeation, may be electrically detected by means of a lead switch 293 and informing it to a driver. In order to control the speed of hydraulic variation, a plurality of passages, through which the hydraulic pressures are passed, each different in diameter, can also be provided in the solenoid valve.

What is claimed is:

1. An antiskid control system comprising a braking hydraulic pressure source, a power source, a reservoir, wheel cylinder means, first passage means which connects said pressure source to said wheel cylinder means, computer means for detecting the substantial locking condition of wheels to produce a fisrt indicating signal, a first solenoid valve actuated in accordance with the first indicating signal from said computer, and hydraulic pressure control means provided in said first passage means including a housing, first servo means in communication with said power source, the communication between said first servo means and said power source means being interrupted by the solenoid valve when the wheels are in the substantially locking condition, first valve means mounted in said first passage means and interrupting said first passage means when the wheels are in the substantially locking condition, a first piston which is operatively connected to said first servo means and which is slidably provided in said housing so as to usually hold said first valve means in its open position, a variable volume chamber formed within said housing by said first piston and adapted to vary effective volume between said first valve means and said wheel cylinder responsive to the operation of said first piston, by-pass passage means which communicates said hydraulic pressure source with said wheel cylinder means, second valve means provided in said by-pass passage means, second servo means in communication with said power source, and second piston means with a part thereof exposed in said first passage means and usually making said second valve means in a closed position by said second servo means.

2. The system according to claim 1, wherein said power source is a source of pressurized hydraulic fluid and said solenoid valve operates so that said source is selectively made in communication with one of said first servo means and the reservoir.

3. The system according to claim 2, including a third usually opened valve means provided in said first passage means to be operatively connected to said second piston means, said second valve means being made in an open position through aaid second servo means and said second piston means and said third valve means being made in a closed position when the pressure in said power source is less than a value as required.

4. The system according to claim 2, further including a fourth normally open valve means provided between said solenoid valve and said first servo means, the fourth valve means being operatively connected to said second piston means, whereby said fourth valve means is urged to be closed when the pressure in the power source is less than a predetermined value.

5. The system according to claim 2, further including a lead switch provided in said housing, the lead switch producing an instruction signal responsive to operation of one of said first servo means and said first piston.

6. The system according to claim 2, having hydraulic flow control means provided between said solenoid valve and said first servo means, said control means including second passage means for rapidly flowing the pressurized fluid from the power source to the first servo means and the pressurized fluid from said first servo means to said reservoir, third passage means to effect a flow slower than that of said second passage means, and second solenoid valve means to open one of said second and third passage means by means of a second instruction signal from said computer means.

* * * * *